UNITED STATES PATENT OFFICE.

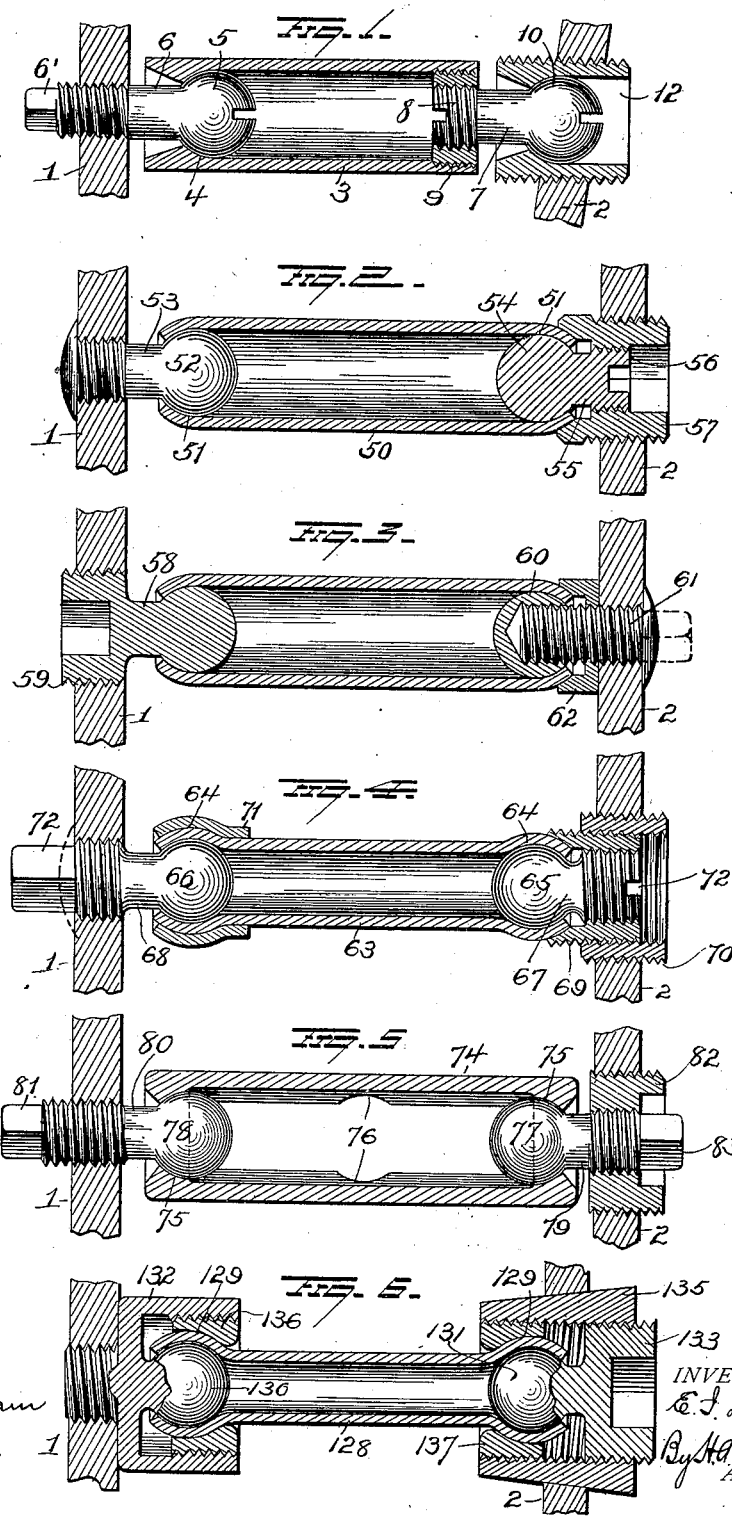
E. I. DODDS.
STAY BOLT.
APPLICATION FILED SEPT. 25, 1911.
1,086,144. Patented Feb. 3, 1914.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,086,144.     Specification of Letters Patent.     Patented Feb. 3, 1914.

Application filed September 25, 1911. Serial No. 651,051.

*To all whom it may concern:*

Be it known that I, ETHAN I. DODDS, a citizen of the United States, residing at Central Valley, in the county of Orange and State of New York, have invented certain new and useful Improvements in Stay-Bolts, of which the following is a specification.

This invention relates to stay-bolts such as are employed for connecting the outside and inside plates of locomotive and other boilers. A serious defect which has hitherto existed in this class of stay-bolts resides in the incapacity of the bolt to adjust itself to the variations in expansion and contraction of the plates owing to the rigidity of the bolt and its connections to the plates.

The leading object of my invention is to provide an improved stay-bolt capable of a universal angular movement or yield at or near both ends thereof, so that the stay-bolt will be relieved of any vibration due to the expansion of the firebox and crown sheets, permitting the sheets to expand and contract at will, all teeter and vibration being absorbed in the universal joints of the bolts, whereby a five-eighths inch bolt-shank will be ample in tension to resist the maximum boiler pressure, as compared with the present practice wherein rigid bolts varying from seven-eighths of an inch to one and one-eighth inch are required.

Another object of the invention is to provide a stay-bolt that can readily be applied from the inside without the trouble and expense of dismantling the engine, and can be adjusted at any time, if necessary, and can be applied, if desired, without tapping either sheet, and especially without tapping the sheet on the bias, which is a difficult operation and likely to produce leakage.

The principle of my invention is capable of embodiment and practical application in a large variety of more or less different specific forms; and in the accompanying drawings I have illustrated several of such forms.

In the accompanying drawings, Figures 1, 2, 3, 4, 5 and 6 inclusive are longitudinal sectional views of different specific forms of my invention all characterized by a hollow bolt having a ball and socket connection with the plates.

In the several figures 1 represents the inside plate of that portion of the locomotive boiler which embraces the fire box, and 2 is the outside plate.

In Fig. 1, 3 designates the shank of the bolt which is hollow and at one end is formed with a concave seat 4 to receive the ball-shaped head 5 of a connector 6 that is screwed into the plate 1. At the opposite end of the shank 3 is a somewhat similar connector 7 having a threaded inner end 8 secured to the bolt-shank 3 by an internal nut 9 and a spherical head 10 engaging a concave seat 11 formed in a bushing 12 tapped through the wall 2. The outer end of the connector 6 has a wrench-hold 6' by which, after the parts have been assembled and applied, the desired tension can be obtained.

In Fig. 2, 50 designates the bolt-shank in the form of a hollow member having inwardly swaged ends forming seats 51. The seat at one end is engaged by the ball-shaped head 52 of a connector 53 secured in the wall 1, and the seat at the opposite end is engaged by the ball-shaped head 54 of a similar connector 55 that has a shank 56 threaded into a bushing 57 set in the wall 2. In assembling, the balls 52 and 54 are first entered into the open ends of the tube 50 and the ends of the latter are heated and swaged inwardly. The inner end of the bushing 57 is also preferably beveled to engage and reinforce the swaged end of the tube 50. This may be applied at both ends, if desired.

The structure shown in Fig. 3 is quite similar to that of Fig. 2, employing the same tubular member 50 having inwardly swaged ends; but in this case the connector 58 at one end has a threaded base 59 engaging the wall 1 of such a size that the tube 50 can be entered through the threaded aperture engaged by the base 59; and the ball 60 at the other end is internally threaded to receive a threaded stud 61 passed through the wall 2. In this case a washer 62 surrounding the stud 61 and bearing upon the swaged end of the tube 50 is preferably employed at either or both ends.

Fig. 4 also shows a tubular bolt-shank 63, the ends of which are swelled to form approximately spherical bearings 64 to receive the ball-shaped heads 65 and 66 of connectors 67 and 68. The connector 68 has a direct threaded engagement with the wall 1, while the connector 67 has threaded engagement with an inner bushing 69, this latter being threaded into an outer bushing 70 tapped into the wall 2. The inner bushing 69 is beveled or chamfered at its inner end to engage the swelled end of the tubular shank 63, and the opposite end of the latter is shown as supplied with an external reinforcement 71, which latter may be applied at both ends if desired. Adjustment may be secured by turning the connector 67 or either of the bushings in which it is carried, or by applying a wrench to the squared projecting end 72 of the connector 68.

In Fig. 5 I show a bolt-shank 73 that is hollow and provided on one or both sides with a slot 74 extending nearly the full length thereof and with hemispherical seats 75 at its ends. The opposite side walls of the slot 74 are formed with notches or cutouts 76 to permit the insertion of the ball-shaped heads 77 and 78 of connectors 79 and 80, respectively. The connector 80 is directly screwed into the wall 1 and provided with a squared end 81, and the connector 79 is similarly screwed into a threaded bushing 82 that engages a threaded aperture in the wall 2 of sufficient size to permit the insertion of the bolt-shank therethrough. The connector 79 likewise has a squared end 83, and the proper tensioning may be secured by applying a wrench to either of the squared ends 81 and 83.

Fig. 6 shows a construction generally similar to that of Fig. 4, but employing auxiliary means to resist the tension upon the hollow enlarged ends of the stay-bolt shank. 128 designates the hollow bolt-shank having spherical end enlargements 129 that embrace ball-shaped heads 130 and 131 on connectors 132 and 133, respectively. The connector 132 has a threaded shank 134 directly engaging the wall 1 and the connector 133 has threaded engagement with a cone bushing 135 entered through the wall 2. The connector 132 and the bushing 135 are internally threaded to receive the washers 136 and 137, respectively, that are formed with concave seats engaging the spherical ends 129 of the bolt-shank and coöperating with the heads 130 and 131 in resisting tensional strains on the bolt-shank.

From the foregoing it will be seen that the broad underlying principle of my invention is that of a double knuckle bolt which permits the free and independent expanding and contracting movements of both plates and permits them to equalize themselves while at the same time preserving the bolts and plates from crystallization, and thus making possible the employment of much lighter stock for the bolts themselves.

Having fully described my invention, what I claim as new and desire to secure by Letters-Patent, is:—

1. A flexible stay bolt comprising a hollow shank, and a connector at each end of the shank and connecting the latter with the walls of the boiler, each connection being rigidly secured at one end to one of said parts, and having a universal joint connection at its other end with the other of said parts, whereby the bolt is free to give or yield at either end to accommodate itself to the movements of both walls of the boiler.

2. A stay bolt comprising a bolt shank having rounded bearings at its ends, connectors adapted to be secured to the boiler walls and having rounded heads fitting within the rounded bearings at the ends of the shank and a bushing separate from and carrying one of said connectors and forming a support for the adjacent end of the bolt shank.

3. A stay bolt comprising a bolt shank having rounded bearings at its ends, connectors adapted to be secured to the boiler walls and having rounded heads fitting within the rounded bearings at the ends of the bolt shank, and means separate from engaging the shank of one of said connectors and bearing against the outer surface of the adjacent rounded bearing of the bolt shank.

4. A stay bolt comprising a bolt shank having rounded recessed bearings at its ends, connectors adapted to be secured to the boiler walls and having rounded heads fitting within the rounded bearings at the ends of the bolt shank, and a threaded bushing embracing the threaded end of one connector and adapted to bear at its inner end against the outer end of the bolt shank.

5. In a stay bolt, a connecting sleeve having both ends bent inwardly, and a pair of bolt members having enlarged ends fitting into said sleeve and held in place thereby.

ETHAN I. DODDS.

Witnesses:
A. VAN CRAENENBROECK,
L. MERRITT.

---

Copies of this patent may be obtained for five cents each, by addressing the "Commissioner of Patents, Washington, D. C."